Dec. 21, 1965   J. L. MUENCH, SR   3,224,741

MIXER

Filed July 1, 1964   2 Sheets-Sheet 1

INVENTOR.
JOHN L. MUENCH SR.
BY Norman N. Popper
ATTORNEY

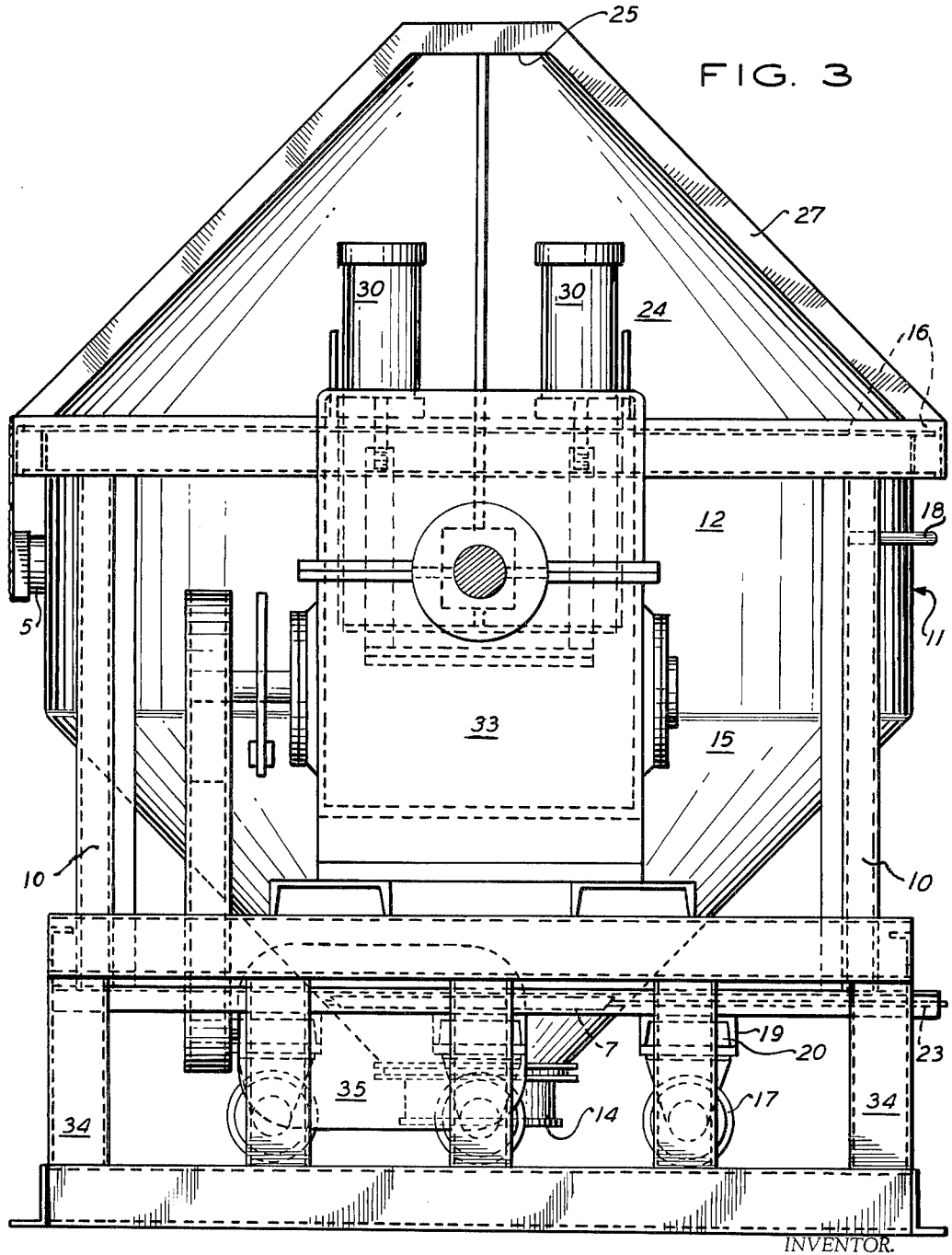

United States Patent Office 3,224,741
Patented Dec. 21, 1965

3,224,741
MIXER
John L. Muench, Sr., 8 Chestnut Place, Short Hills, N.J.
Filed July 1, 1964, Ser. No. 379,578
5 Claims. (Cl. 259—30)

My invention relates to mixers generally, and particularly to a device constituting a combination of a vessel and a mixer in which the vessel may be demounted from the mixer to perform its normal sole function.

It is an object of the invention to provide a mixer for which a vessel cooperates with the mixer to enable the performance of the mixing function, and yet is separable therefrom to function as a transport vessel.

It is another object of the invention to provide a mixer that is easily cleaned and becomes readily available for further mixing operations, by the substitution of one separate vessel for another.

A still further object of the invention is to provide a mixer with a separable vessel from which material may be readily discharged after a mixing operation.

A still further object of the invention is to provide a vessel with provisions formed thereon for engagement with a lid, thereby to seal the contents of the vessel with the lid.

A further object of the invention is to provide a lid to which numerous vessels may be successively attached, and then each vessel may be caused to rotate in combination with the lid, so that numerous batches can be separately prepared and mixed, each in their own container.

These objects and advantages as well as other objects and advantages may be obtained by the apparatus shown in the drawings in which:

FIGURE 3 is a side elevational view of the mixer.

Figure 1:
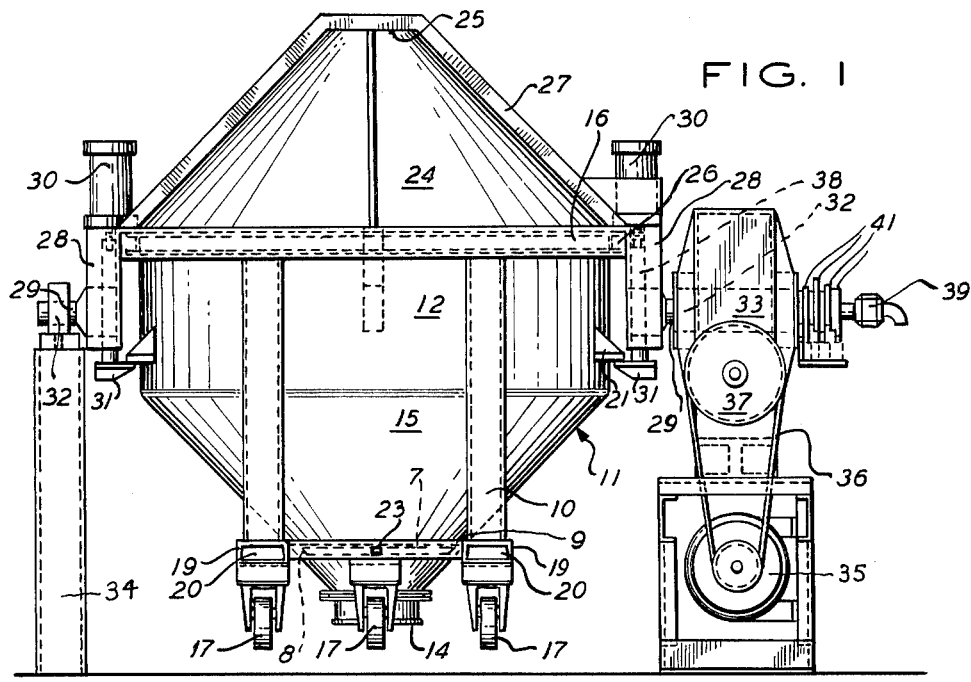
FIGURE 1 is a front elevational view of a mixer.
Figure 2:
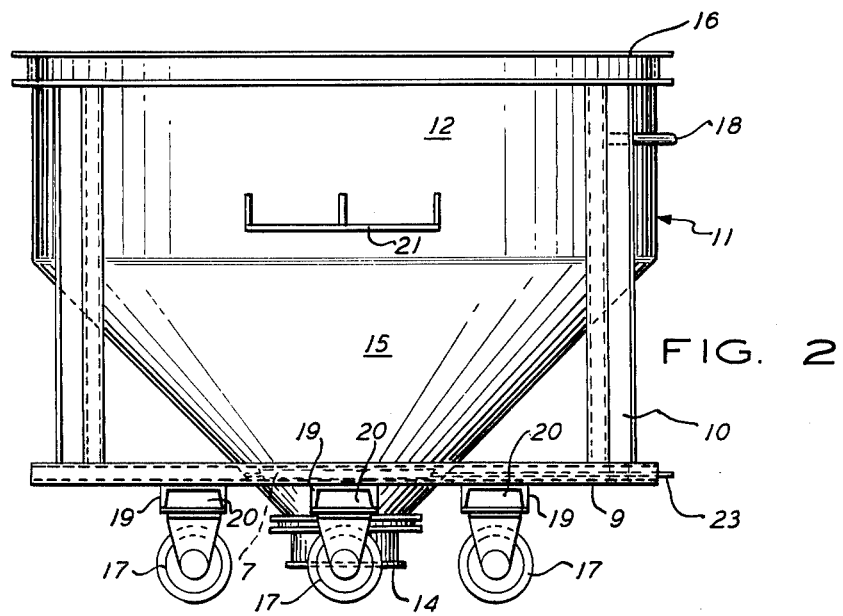
FIGURE 2 is a side elevational view of the hopper portion of the mixer.

In present mixing operations, it is usual to use a vessel and a lid, which are integral parts of a mixer in which the contents are subject to agitation, by revolving the closed vessel. At the conclusion of the operation, the contents are emptied from the vessel for transportation in a separate vessel. Likewise, at the commencement of the operation, the mixer is filled by dumping the contents of a vessel into the mixer.

It has been found that a separate vessel on wheels, or a similar type of transport mechanism which is not a part of the mixer may be made in such a manner, that it is unitable with the mixer which does not have a vessel but only a lid to which it can be attached. When the vessel is in sealed engagement with the lid, means is provided for rotating the lid with the vessel attached, so that the contents are tumbled and thoroughly mixed without ever leaving the transport vessel. The attachment of the vessel to the lid may be provided by lifting jacks, which raise the vessel off the surface upon which it rested into sealed engagement with the lid, and after the mixing operation is complete, lower the vessel to the surface upon which the apparatus rests so that it may be moved away. The drawings are illustrative of the inventive concept and show an apparatus embodying the inventive concept.

Referring now to the drawings in detail, a vessel or hopper 11 is provided. The hopper is a generally tubular top portion 12 and a frustoconical, bottom portion 15. The bottom portion terminates in a controlled discharge opening 14. A frame 10 extends to a flange 16 located at the top of the top portion 12 of the hopper 11. The support 10 is mounted on a frame 9. A number of casters 17 are attached to the bottom of the frame 9 so that the vessel 11 may be moved about. A handle 18 enables the hopper 11 to be propelled and maneuvered as may be required. The brackets 19 support the casters 17 and are provided with fork-receiving slots 20, to receive the fork of a fork-lift truck, so that in addition to being pushed by the handle 18, on the casters 17, the hopper 11 may be transported by a truck.

The hopper 11 also has lifting brackets 21 disposed on opposite sides of the generally tubular top portion 12. These lifting brackets 21 are designed to be engaged by lifting jacks 30, so that the hopper 11 may be raised or lowered as may be required. The top of the top portion 12 is provided with a radial flange 16 which flange is dimensioned to engage a lid hereinafter referred to, and to close the top of the vessel 11 by such engagement. A control shaft 23 for a valve 7 governs the discharge opening 14, so that the contents of the hopper 11 may be discharged as required after the contents have been mixed.

A lid assembly, lifting jacks, and a means for rotating the lid assembly and lifting jacks are provided. The lid 24 is a frusto-conical cover, closed at the top 25 and open at the bottom. It is provided with a peripheral reinforcing ring 26 at the bottom and reinforcing struts 27 extending to the top. Brackets 28 are attached to an axle 29 extending outwardly and radially with respect to the lid 24. The brackets 28, 28 each mount a pair of jacks 30, 30 which may be pneumatic or hydraulic or any suitable lifting means such as a motor driven pinion engaged with a rack. A latch 31 is attached to the bottom of the shaft of each of the jacks 30. When the latch 31 is in its lowest position, the hopper 11 may be wheeled into place with the lifting brackets 21 positioned above the latch 31. The operation of the jacks will cause the latches 31 to rise and engage the lifting brackets 21 thereby raising the hopper 11 until its top flange 16 is in sealing engagement with the bottom of the lid 24. Likewise the reversal of the operation of the jacks 30 will cause the latches 31 to move in a downward direction until the hopper 11 is resting upon the surface upon which it originally stood. The axle 29 is supported on one side by the bearing 32. The opposite axle 29 is supported on a similar bearing 32. A gear reduction drive 33 is connected to that end of the axle 29. The supports 34, 34 support the lid 24 and the drive assembly. The gear reduction drive is driven by a motor 35 mounted on the supports 34, and is connected to the gear reduction drive 33 by a belt 36, or by a chain or other suitable means engaging the pulley 37.

A conduit 38 extends through the bracket 28 and communicates with the lifting jacks 30. The opposite end of the conduit 38 communicates with a bore in the axle 29, which bore terminates in a rotary air transfer joint 39.

The control system for operating the device is not part of the invention. Four cams 41, etc. are shown at one end of the axle 29 and these may be connected to a control apparatus to actuate the lifting jacks, to operate a switch to turn on the motor 35, to stop the motor, and bring the rotation of the device to a halt at the hopper 11 in low discharge position, and then to operate the jacks 30 to lower the latches 31 so that the hopper 11 may be returned to rest in its casters 17.

In operation, the hopper 11 is pushed or otherwise transported to a position immediately under the lid 24, against a positioning stop 5. Fluid is introduced into the rotary air transport joint 39 to operate the jacks 30, etc. so that the latches 31 engage the brackets 21 and raise the hopper 11 to tight engagement with the lid 24. The motor 35 is then energized and the lid 24 and hopper 11 are then rotated in hermetic sealed engagement with each other. The contents are agitated, tumbled and blended until the desired degree of homogeniety has been reached at which time a motor circuit is opened and the hopper 11 is made to assume the normal downward position with respect to the lid 24. Fluid withdrawn through the rotary air transfer joint 39 operates the jacks 30, etc. so that the latches lower the hopper 11. The hopper 11 then may be rolled away.

The apparatus may be provided with safety latches (not shown) to supplement the latches 31 so that in the event of failure of the jacks 30 the lid 24 and hopper 11 will not become disconnected from each other centrifugally with destructive effect. It will be seen that this device eliminates the necessity for the use of an integral vessel whose contents must be dumped from the mixer after the mixing operation is complete. Furthermore, in addition to the elimination of two steps, requiring two additional accessory vessels, the cleansing of the mixer hopper may be easily accomplished by simply flushing out the lid. Great economy and convenience is achieved by this apparatus.

The foregoing description is intended to be merely illustrative of one embodiment of the invention for many changes may be made in the construction, selection and arrangement of the parts, all within the scope of the intended claim, without departing from the spirit of the invention.

What is claimed:
1. A mixer comprising:
 (a) a generally horizontal axle,
 (b) a lid attached to the axle and having an end dimensioned to cover a vessel,
 (c) a support for the axle,
 (d) means to rotate the axle on the support,
 (e) a pair of jacks attached to the lid,
 (f) latches operably attached to the jacks, for engaging a vessel, lifting the vessel into sealing engagement with the lid, holding the vessel to the lid during rotation of the lid, lowering the vessel, and disengaging it after rotation has creased, the lid and vessel collectively defining a unitary, closed blending chamber when engaged to each other,
 (g) the axle having a bore connected to the jacks for supplying actuating fluid to the jacks before, after, and during rotation of the axle,
 (h) a separate vessel, sufficiently low, to be moved beneath the lid into position to be engaged and lifted by the jacks, and having an open top dimensioned to engage the lid as a cover, the vessel held engaged with the lid.

2. A mixer comprising:
 (a) a device according to claim 1,
 (b) a plurality of castors on the vessel,
 (c) a discharge orifice in the vessel,
 (d) a valve governing the discharge orifice.

3. A mixer comprising:
 (a) a pair of spaced apart generally horizontal coaxial axles;
 (b) means for rotatably supporting each axle;
 (c) lift means on each axle;
 (d) a lid, open at the bottom attached to and between the lift means, the lift means depending from the lid when the open bottom thereof faces downwardly;
 (e) a vessel open at the top dimensioned for sealing engagement with the lid by means of the said lift means,
 (f) the lid and vessel collectively defining a unitary, closed blending chamber when engaged to each other.

4. A mixer comprising:
 (a) a structure in accordance with claim 3, and
 (b) means for rotating at least one axle.

5. A mixer comprising:
 (a) a generally horizontal axle,
 (b) a lid attached to the axle,
 (c) a support for the axle,
 (d) a jack attached to the lid for lifting a vessel into sealing engagement with the lid, and for lowering the vessel from the lid, the lid and vessel collectively defining a unitary, closed blending chamber when engaged to each other, and the axle having a bore through which fluid is supplied to the jack.

References Cited by the Examiner
UNITED STATES PATENTS

| | | | |
|---|---|---|---|
| 3,081,070 | 3/1963 | Welsch | 259—89 |
| 3,137,327 | 6/1964 | Muench | 259—81 |

WALTER A. SCHEEL, *Primary Examiner.*

CHARLES A. WILLMUTH, *Examiner.*

ROBERT W. JENKINS, *Assistant Examiner.*